United States Patent [19]

Cole

[11] 4,195,289
[45] Mar. 25, 1980

[54] MICROWAVE INTRUSION OR MOVEMENT DETECTORS

[75] Inventor: Martin T. Cole, East Bentleigh, Australia

[73] Assignee: I.E.I. Proprietary Limited, Huntingdale, Australia

[21] Appl. No.: 873,922

[22] Filed: Jan. 31, 1978

Related U.S. Application Data

[63] Continuation-in-part of Ser. No. 637,394, Dec. 3, 1975, abandoned.

[51] Int. Cl.² .................. G01S 9/42; G08B 13/18; H01Q 13/06
[52] U.S. Cl. ..................... 340/554; 343/5 PD; 343/778; 343/786
[58] Field of Search ............ 340/554; 343/5 PD, 7.7, 343/702, 772, 773, 774, 778, 781 R, 786

[56] References Cited

U.S. PATENT DOCUMENTS

| 3,270,339 | 8/1966 | McEuen et al. | 340/554 X |
| 3,665,443 | 5/1972 | Galvin | 340/560 |
| 3,728,721 | 4/1973 | Lee et al. | 343/5 PD |
| 3,760,400 | 9/1973 | Galvin et al. | 340/554 |
| 3,832,709 | 8/1974 | Klein et al. | 343/5 PD |
| 3,845,461 | 10/1974 | Foreman | 340/1 R |
| 3,942,178 | 3/1976 | Hackett | 343/5 PD |
| 3,947,834 | 3/1976 | Gershberg et al. | 340/554 |
| 4,042,934 | 8/1977 | Davis | 343/786 |

Primary Examiner—John W. Caldwell, Sr.
Assistant Examiner—Joseph E. Nowicki
Attorney, Agent, or Firm—Learman & McCulloch

[57] ABSTRACT

A microwave movement detector which is capable of discriminating between progressive or unidirectional movement such as that by an unauthorized intruder and reciprocating movement such as by a curtain. The detector includes a pair of receiver/mixer diodes into which a transmitted signal is mixed with a surveying signal causing a phase difference so that the resultant signals have a different phase relationship amplifying the resultant signals feeding the signal into an integrating circuit in similar counter so that an alarm is sounded when the counter reaches a high or low threshold level.

6 Claims, 3 Drawing Figures

MICROWAVE INTRUSION OR MOVEMENT DETECTORS

REFERENCE TO RELATED APPLICATION

This application is a continuation-in-part of my copending application Ser. No. 637,394, filed Dec. 3, 1975, now abandoned.

THE INVENTION

This invention relates to an intrusion or movement detector utilizing the transmission and reception of a microwave radio signal for the purpose of detecting moving objects in a manner which effectively discriminates against unwanted interfering phenomena. These phenomena could otherwise cause false operation of the detector.

BACKGROUND OF THE INVENTION

Microwave intrusion detectors are known for detecting the movement of objects (preferably human) within an area of coverage. In general, a microwave signal is transmitted into the zone under surveillance and the signals reflected back from every object in the zone, are returned to a receiver. Should one of the objects in that zone be moving, then the signal received after reflection off that object will be of changing phase. The rate of change of phase is proportional to the velocity of movement of the object. By mixing this received signal with a portion of the transmitted signal, there is produced a resultant frequency equal to the rate of change of phase. This frequency is amplified and processed in order to activate an alarm when movement of objects within the zone occurs.

The disadvantage of such designs is that there is no ability to determine the type of motion of the object. Merely the existence of motion is detected. Thus, there can be no discrimination against reciprocating motion such as vibration, swaying curtains, swinging signs, etc., which are moving about a static mean point. This reciprocating motion can cause high false alarm rates, and is a different form of motion from that expected from an intruder. An intruder does not move about a static mean point but the contrast, must progress substantially unidirectionally through the zone for some distance. Existing microwave intruder detectors known to Applicant are unable to distinguish between progressive and reciprocating motion.

False alarm rates for existing designs of microwave detectors, caused by various forms of interference, are minimized by control of the bandwidth of the amplifier and by careful adjustment of threshold level, integration rate and decay time within signal processing circuitry. However, even the best designs of this type do not reduce the false alarm rate attributable to reciprocating motion.

Use of a microwave transmission medium despite the above mentioned setbacks has the advantage over ultrasonic systems of not being affected by interference from wind or air turbulence or acoustic noise.

It is an objective of this invention to provide a microwave movement detector which can discriminate between progressive or unidirectional movement and reciprocating movement.

DESCRIPTION OF THE INVENTION

There is provided by the present invention in a microwave movement detector including a transmitter and receiver for transmitting and receiving a microwave signal or signals in an area to be surveyed by the detector the improvement comprising at least a pair of receiver/mixer diodes into which a portion of the transmitted signal is mixed with the surveying signal received at each diode means introducing a phase difference into either the receiver path or the transmitter path or both such that the resultant signals in the mixing process have a differing phase relationship.

By providing at least this one additional receiving diode and changing the phase relationship enables detection and discrimination of a specific type of motion.

The invention may be manufactured in the form of a waveguide, co-axial or stripline assembly.

In one form of the invention a portion of the transmitted signal is fed to the receiver section at a point behind the first receiver diode in a line configuration of diodes such that the surveying signal is received in a different phase at each diode. The actual phase difference is generally determined by the geometry chosen for the microwave hardware.

In an alternative form of the invention the receiver survey signal is supplied into two paths. At the end of each path is a receiver/mixer diode. A portion of the transmitted signal is fed into each receiver path in such a manner that one path is fed in a different phase from the other. This again produces two resultant frequencies with the diodes which are of differing phase. These said phase differences may be introduced further into one receiving path or alternatively into one of the transmitter feed paths or both.

The difference in phase of the two resultant signals is used to determine whether the object is moving either toward or away from the detector. The specific phase difference is independent of the velocity of the object. For motion toward the detector, the phase of one resultant signal will lead the other. For motion away from the detector, this phase relationship will reverse.

After amplification of the resultant signals to a convenient level, the phase of these signals is compared, to result in an output which signifies either an approaching or receding motion.

This output is used to cause a counting or integrating circuit to count upwards or downwards in accordance with motion of one direction or the other. Reciprocating motion will cause the counting circuit to count equally up and down, averaging at zero net gain or loss. By contrast, progressive motion will cause the counting circuit to count in one direction only. A sufficient number of counts in one direction or the other, will cause a preset threshold level such as an upper or lower limit to be reached, thereby causing the alarm circuit to be triggered.

A combination of reciprocating motion and progressive motion will cause a net gain or loss of counts such that one preset level will be reached. Thus, the existence of reciprocating motion does not overcome the ability of the detector to recognize progressive motion.

False alarms caused by reciprocating motion can be eliminated by this invention, and other causes of false alarms have been overcome by refined techniques of controlled amplifier bandwidth, interference suppression, integration rates, decay times and threshold levels within the processing circuitry.

PRACTICAL FORM OF THE INVENTION

Figure 1:
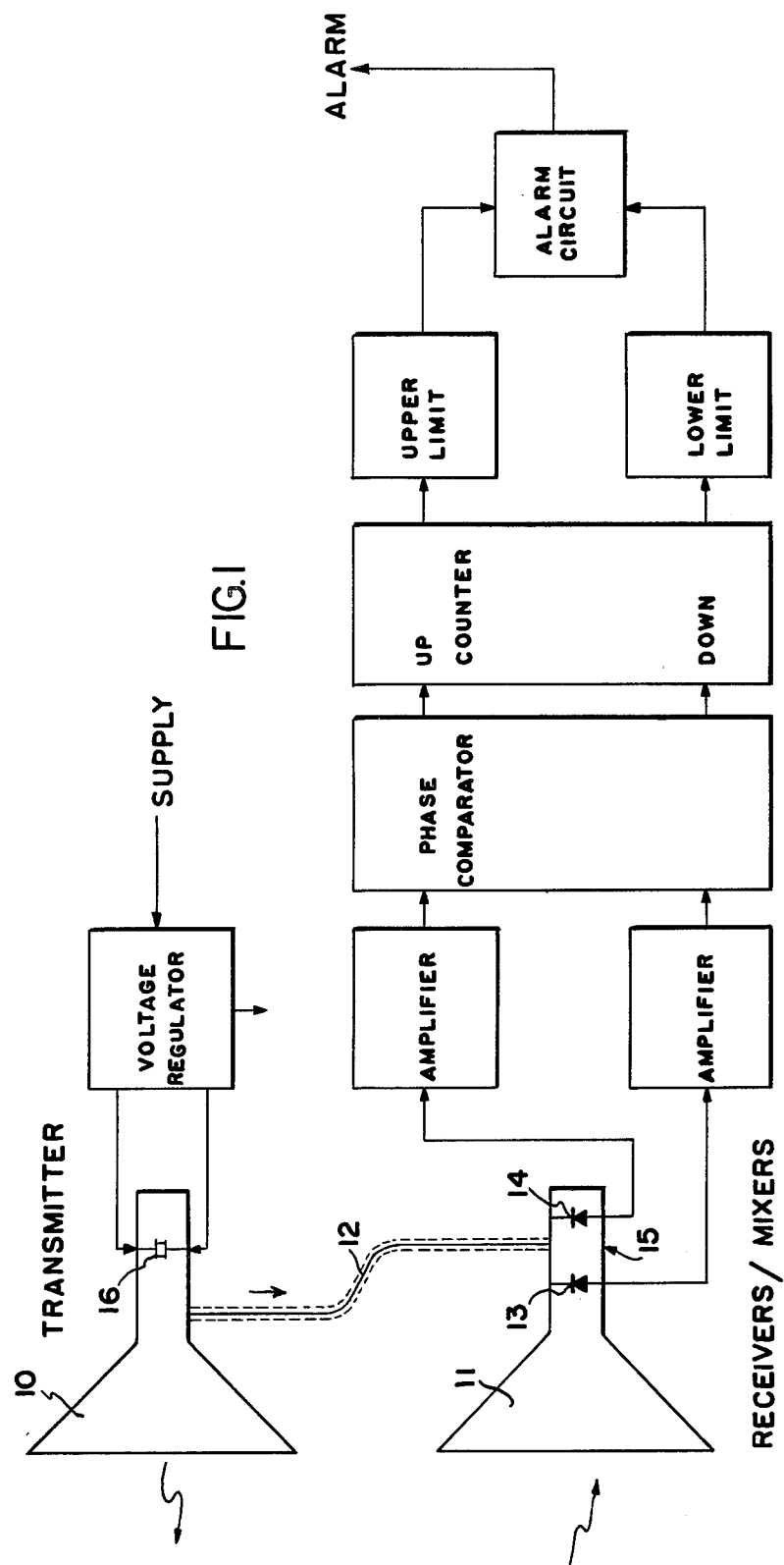
FIG. 1 is a schematic view of the various sections of a microwave movement detector in accordance with the present invention.

One practical form of the invention is illustrated in FIG. 1. Two microwave horn antennas 10, 11 are shown, one for the transmitter which for convenience utilizes a Gunn-effect device 16, and one for the pair of receivers. It is possible to use only one antenna and to use a circulator or a ratrace to provide the necessary isolation between transmitter and receivers. The important feature is to provide means for a phase difference in the resultant signals.

The receiver of FIG. 1 includes two diode detectors, 13 and 14, which modulate detected or received reflected surveying signals from the transmitter with a reference signal coupled from the transmitter 10 via a microwave transmission means 12 to the waveguide 15 of receiver 11. The microwave transmission means 12 is positioned to introduce the reference signals into the waveguide 15 so that the reference signal will be detected by diodes 13 and 14 simultaneously to result in in-phase reference signals being present at the two diodes.

The diodes are positioned at a distance from each other which is not a multiple of a wavelength of the frequency being used and therefore the received, reflected surveying signals are detected by diodes 13 and 14 as signals of the same frequency but of differing phase.

Diode detectors 13 and 14 therefore provide outputs that are a function of the received signal and a reference signal from the transmitter. These outputs are of a common frequency but of differing phase as the result of the location of the diodes within the waveguide. The output signals from the diodes are amplified and applied to a phase comparator that detects which of two out-of-phase input signals is leading and provides an indicative pulse output at predetermined intervals. An example of such a phase comparing circuit is presented in U.S. Pat. No. 3,646,455 on "Phase-Detecting Circuit" issued to E. Coccagna on Feb. 29, 1972. When a phase comparing circuit such as the Coccagna circuit is used, a square wave generator may be incorporated between the amplifiers and the phase comparators to enhance system operation. A typical square wave generator which may be incorporated in the circuit is illustrated in U.S. Pat. No. 3,504,199 on "Square Wave Generator Comprising Back-To-Back Series-Connected Charge Storage Devices" issued Mar. 31, 1970 to M. Cooperman.

The phase comparator produces outputs of a high and low level indicative of which signal leads the other. These outputs are applied to a counter of the type responsive to two input signals and capable of counting in either of two directions as a function of the two input signals. Counters of the type which may be incorporated in this circuit are illustrated in U.S. Pat. No. 3,391,342 on "Digital Counter" issued July 2, 1968 to B. Gordon et al or U.S. Pat. No. 3,004,249 on "Signal Responsive Apparatus" issued Oct. 10, 1961 to E. Ostroff. The Ostroff circuit in an up-down counter with logic means to generate signals at predetermined up or down limits similar to the upper limit and lower limit means of FIG. 1. These limit detecting devices provide an output signal that may be used to activate an alarm.

Thus FIG. 1 illustrates one practical method for achieving the desired two signals of differing phase, together with a block schematic of the amplifying and processing sections which operate in the manner previously described.

Figure 3:
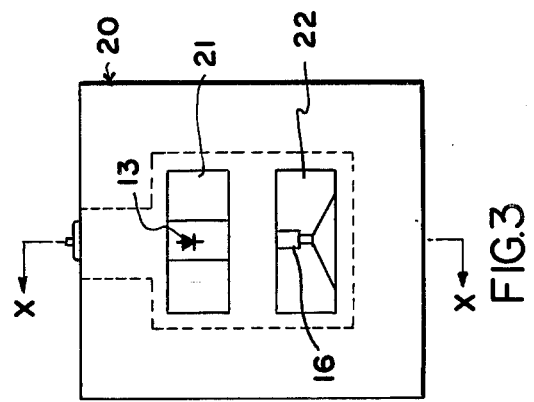
FIG. 3 is an end view of the transmitter and receiver section.
Figure 2:
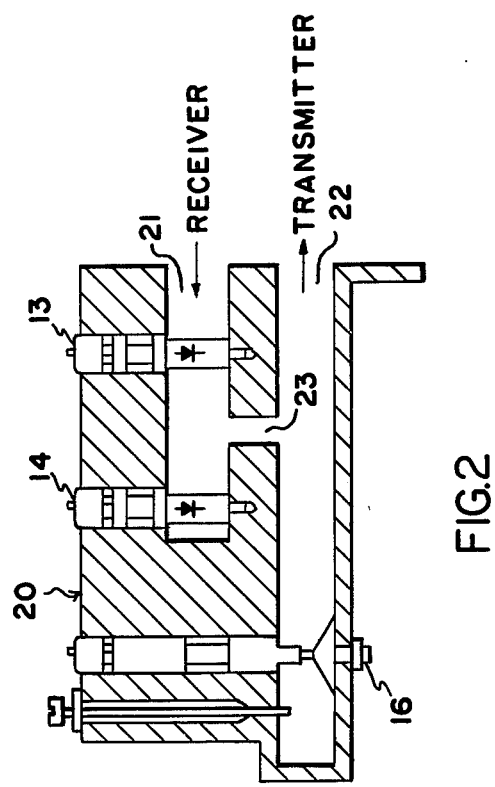
FIG. 2 is a sectional view taken on lines X—X of a transmitter and receiver section.

Referring to FIGS. 2 and 3 there is detailed a further alternative form of the invention. A die-casting 20 (for example) is constructed as a hollow member having conductive inner surfaces to form a pair of waveguides 21 and 22. One waveguide 22 forms the oscillator/transmitter section. The other waveguide 21 forms the receiver section and contains two receiver/mixer diodes as shown. The rectangular cross-section of the waveguides is a function of the wavelength of the frequency of said transmitter. An aperture 23 couples between the two waveguides so that a portion of the transmitter signal is fed to the receiver section at a point between the two diodes. This enables two received signals of differing phase to be obtained. These signals are amplified and processed in the manner previously described. The field pattern of transmission, and thus the area of coverage, may be modified by means of a horn (not shown) which can be fixed to the front of the casting. The advantages of this design over that of FIG. 1 are simplified construction, elimination of a co-axial cable, and the ability to use a single horn antenna instead of two. The coupling aperture could alternatively be made into a co-axial coupling (not shown) by inserting a suitable length rod in the centre of the hole, supported by a dielectric material.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What I claim is:

1. A microwave movement detector, comprising:
  a transmitter for generating and radiating a microwave signal;
  a microwave receiver for detecting reflected surveying signals from said transmitter;
  a microwave transmission means for coupling a reference signal from said transmitter to said microwave receiver;
  said microwave receiver comprises:
    a waveguide;
    a plurality of receiving/mixing means producing outputs which are a function of said reference signal and said reflected surveying signal, each of said receiving/mixing means positioned within said waveguide for creating a unique phase delay between said reference signal and said reflected surveying signal;
  phase comparison means responsive to each of said receiving/mixing devices for creating first and second level signals as a function of the relative phase delay between the outputs of said receiving/mixing means;
  a counter means for counting in a first direction in response to signals of said first level from said phase comparing means and in a second direction in response to signals of said second level from said phase comparing means; and means to produce an alarm when said counter exceeds a predetermined upper or lower count.

2. An apparatus as defined in claim 1 wherein said microwave transmission means is coupled to said waveguide at a position which will cause said reference signals to be received by all of said receiving/mixing means in common phase relationship.

3. An apparatus as defined in claim 1, further comprising:

first and second amplifier means for increasing the amplitude of the outputs of said receiving/mixing means and coupling said amplitude increased signals to said phase comparator.

4. An apparatus as defined in claim 1 wherein said receiving/mixing means are diode detectors.

5. An apparatus as defined in claim 1 wherein said waveguide is a hollow member having conductive inner surfaces having a cross section dimension which is a function of the wavelength of the frequency of said transmitter.

6. An apparatus as defined in claim 1 wherein said waveguide is rectangular in cross section.

* * * * *